US009957797B2

(12) United States Patent
Pettersson et al.

(10) Patent No.: US 9,957,797 B2
(45) Date of Patent: May 1, 2018

(54) METHOD AND ARRANGMENT FOR MOUNTING BOLTS IN A TUNNEL WALL

(71) Applicant: SKANSKA SVERIGE AB, Stockholm (SE)

(72) Inventors: Lars Pettersson, Täby (SE); Pertti Johansson, Frillesås (SE); Håkan Svensson, Stora Höga (SE)

(73) Assignee: SKANSKA SVERIGE AB, Stockholm (SE)

( * ) Notice: Subject to any disclaimer, the term of this patent is extended or adjusted under 35 U.S.C. 154(b) by 0 days. days.

(21) Appl. No.: 15/323,679

(22) PCT Filed: Jul. 1, 2015

(86) PCT No.: PCT/EP2015/065001
§ 371 (c)(1),
(2) Date: Jan. 3, 2017

(87) PCT Pub. No.: WO2016/001315
PCT Pub. Date: Jan. 7, 2016

(65) Prior Publication Data
US 2017/0159434 A1    Jun. 8, 2017

(30) Foreign Application Priority Data
Jul. 3, 2014    (SE) ...................................... 1450836

(51) Int. Cl.
*E21D 20/00*    (2006.01)
*E21B 7/02*    (2006.01)
(Continued)

(52) U.S. Cl.
CPC ............ *E21D 20/003* (2013.01); *E21B 7/022* (2013.01); *E21B 44/00* (2013.01); *E21D 20/00* (2013.01);
(Continued)

(58) Field of Classification Search
CPC ............ E21D 20/028; E21D 2021/006; E21D 20/025; E21D 20/02; E21D 20/021
(Continued)

(56) References Cited

U.S. PATENT DOCUMENTS 3,226,064 A * 12/1965 Thompson .............. E21B 7/022
173/193
3,346,300 A * 10/1967 Grant ...................... C21L 37/06
15/104.096

(Continued)

FOREIGN PATENT DOCUMENTS

EP        0130969    6/1983
EP        0126046    11/1984
(Continued)

OTHER PUBLICATIONS

International Preliminary Report on Patentability for PCT/EP2015/065001 dated Feb. 12, 2016.
(Continued)

*Primary Examiner* — Benjamin F Fiorello
*Assistant Examiner* — Edwin J Toledo-Duran
(74) *Attorney, Agent, or Firm* — Tucker Ellis, LLP; Patrick F. Clunk

(57) ABSTRACT

The present invention relates to a method, and an arrangement for mounting bolts in a material. The method comprises: storing actual data representing the actual positions of bore holes having been bored in the tunnel wall by a drill rig (300), a control unit (800) instructing a bolting device (200) to mount bolts in the bore holes based on the stored actual data.

23 Claims, 5 Drawing Sheets

(51) Int. Cl.
  *E21B 44/00* (2006.01)
  *E21D 20/02* (2006.01)
  *G05B 19/416* (2006.01)

(52) U.S. Cl.
  CPC ......... *E21D 20/028* (2013.01); *G05B 19/416* (2013.01); *E21D 20/006* (2013.01); *G05B 2219/45129* (2013.01)

(58) Field of Classification Search
  USPC .................................. 405/259.1–259.6, 262
  See application file for complete search history.

(56) References Cited

U.S. PATENT DOCUMENTS

| | | | | |
|---|---|---|---|---|
| 3,729,056 A * | 4/1973 | Paurat | ..................... | E21D 9/102 173/193 |
| 4,226,559 A * | 10/1980 | Prebensen | ............... | E21B 7/025 173/184 |
| 4,229,124 A | 10/1980 | Frey et al. | | |
| 4,343,367 A * | 8/1982 | Mashimo | .............. | E02F 9/2037 173/190 |
| 4,351,625 A | 9/1982 | Selestam et al. | | |
| 4,398,850 A * | 8/1983 | Talvensaari | ........... | E21D 20/006 173/193 |
| 4,436,455 A * | 3/1984 | Vance | ................... | E21B 19/084 173/195 |
| 4,499,953 A * | 2/1985 | Molin | .................... | E21B 7/025 173/194 |
| 4,712,624 A * | 12/1987 | Mashimo | ................. | G01C 7/06 173/193 |
| 4,832,536 A | 5/1989 | Spross et al. | | |
| 5,113,969 A * | 5/1992 | Drolet | ........................ | E21D 9/12 182/2.11 |
| 5,114,279 A * | 5/1992 | Bjerngren | ............. | E21D 20/006 405/259.1 |
| 5,213,169 A * | 5/1993 | Heller | ........................ | E21B 4/20 173/185 |
| 5,246,313 A * | 9/1993 | Combet | ................. | E21D 20/006 173/192 |
| 5,570,975 A * | 11/1996 | Reinert, Sr. | ............... | E02D 7/26 173/184 |
| 5,951,208 A * | 9/1999 | Wilson | .................. | E21D 20/003 405/259.6 |
| 6,112,834 A * | 9/2000 | Barrett | .................. | E21B 19/084 175/162 |
| 6,135,674 A | 10/2000 | Neilson | | |
| 6,155,343 A * | 12/2000 | Nazzal | ..................... | E21B 29/00 166/222 |
| 6,490,527 B1 * | 12/2002 | Utt | ........................... | E21B 47/00 175/50 |
| 6,857,706 B2 * | 2/2005 | Hames | ..................... | E21C 25/16 299/1.1 |
| 6,957,707 B2 * | 10/2005 | Koivunen | ............... | E21B 7/022 173/11 |
| 7,883,298 B2 * | 2/2011 | Brandi | .................. | E21D 20/003 299/33 |
| 7,921,918 B2 * | 4/2011 | Bryant, Jr. | ............... | E21B 29/12 166/351 |
| 8,301,382 B2 * | 10/2012 | Herrera | ................... | E21B 44/00 702/10 |
| 9,476,256 B2 * | 10/2016 | Pursimo | ................. | E21B 7/022 |
| 2002/0036101 A1 * | 3/2002 | Huhdanmaki | .......... | E21B 19/14 175/52 |
| 2003/0066665 A1 * | 4/2003 | Coombs | ................ | E21D 20/006 173/32 |
| 2004/0177979 A1 * | 9/2004 | Rubie | ................... | E21B 19/087 173/28 |
| 2008/0230270 A1 * | 9/2008 | Eilo | ........................ | E21B 7/025 175/26 |
| 2011/0026364 A1 * | 2/2011 | Lee | ........................... | G01S 5/28 367/127 |
| 2016/0215622 A1 * | 7/2016 | Nelson | ................. | E21D 20/003 |

FOREIGN PATENT DOCUMENTS

| | | |
|---|---|---|
| FR | 1359297 | 3/1963 |
| FR | 2457962 | 6/1979 |
| GB | 2043748 | 10/1980 |
| GB | 1581717 | 12/1980 |
| SE | 417742 | 4/1981 |
| SE | 451867 | 11/1987 |
| WO | 9712122 | 4/1997 |
| WO | 03085233 | 10/2003 |
| WO | 2011104441 | 9/2011 |
| WO | 2013098459 | 7/2013 |
| WO | 2013098460 | 7/2013 |

OTHER PUBLICATIONS

Annex to International Preliminary Report on Patentability for PCT/EP2015/065001 dated Apr. 17, 2015.

* cited by examiner

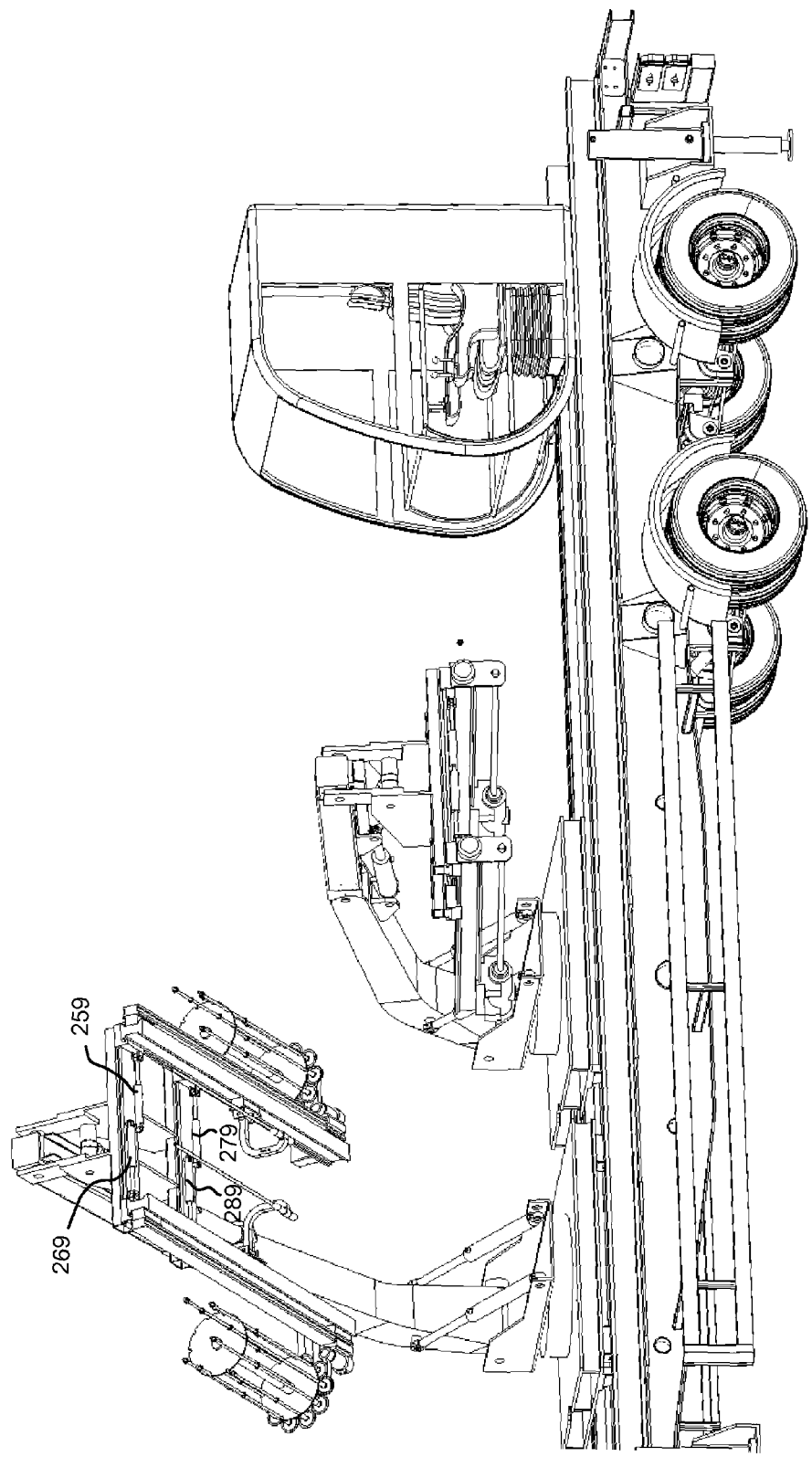

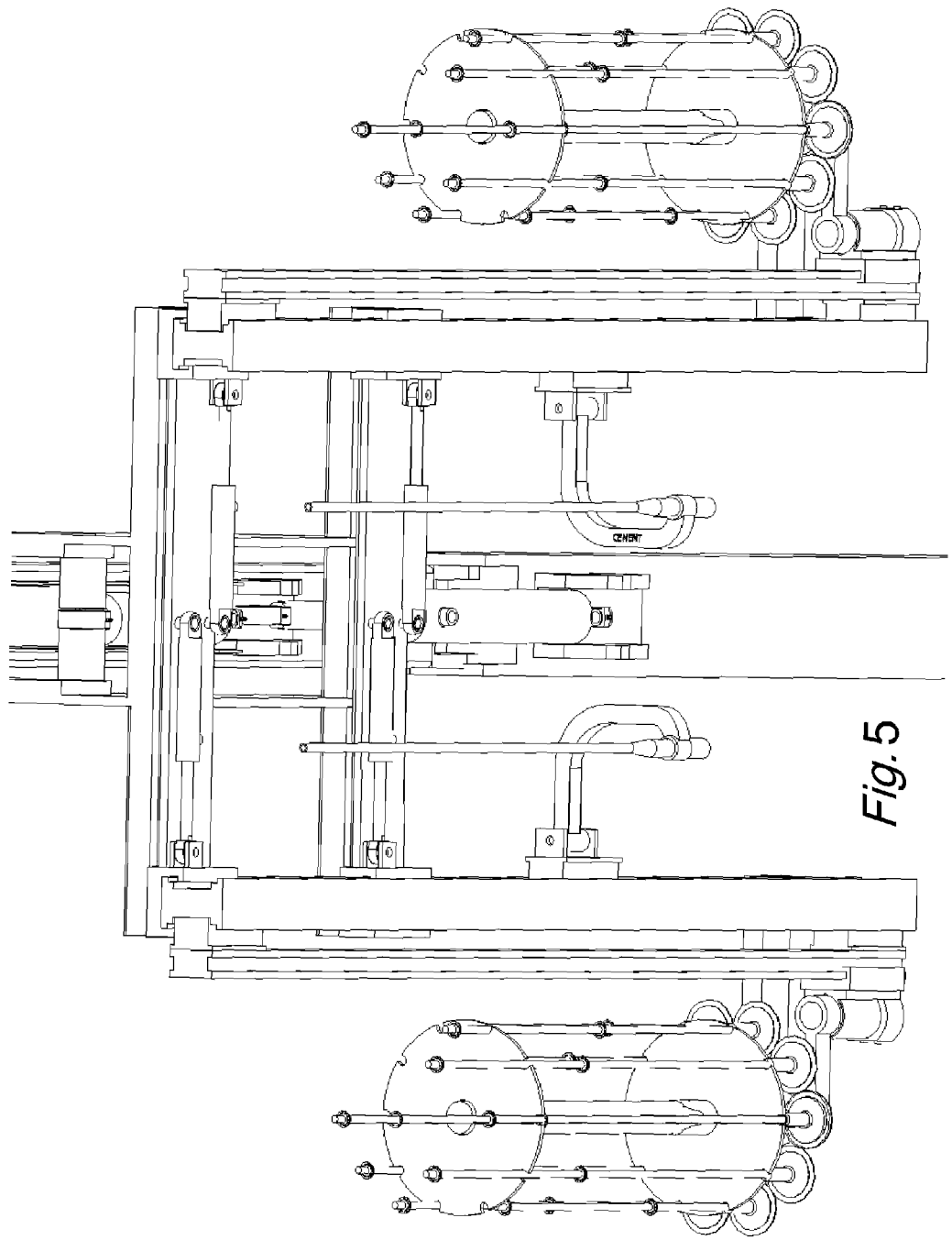

ical Field

The present invention relates to an arrangement and a method for mounting bolts in a tunnel wall.

BACKGROUND ART

When blasting a tunnel, bolts are mounted in the inner wall for various reasons. The bolts can, e.g. be used for stretching a water tight membrane. They can also be used as crash protection or as protection against landslide. Even if a certain shape is planned, during blasting, the cavity forming the tunnel does not necessarily gain the shape planned. This can be compensated for by, e.g., setting bolts of greater or smaller length. However, bolts of greater lengths might easier break if run into. To mitigate this one might measure the lengths of the mounted bolts and then make some of the bolts more rigid. This is however usually not performed since the work to check about 10 000 bolts is insurmountable.

When mounting the bolts all the holes for the bolts are bored in accordance with a predetermined project plan. After that, construction workers use aerial work platforms to gain the right height and manually fill the bore holes with grout and insert bolts in the holes. Naturally, this work is hard and takes time and the bolts and the grout are heavy. Furthermore, the risk of the people making errors is quite high. Instead of grout, chemical anchors can be used which however are expensive. Alternatively, expanders can be used but expanders do not provide satisfactory attachment.

WO 2013/098460 and WO 2013/098459 each relate to a method for drilling holes in a tunnel, and post-processing of the pre-drilled holes. During drilling, positioning data of the hole is gathered and stored in a control unit. The stored positioning data is used when rough positioning a post-drilling unit in a vicinity of a pre-drilled hole. The positioning also comprise a fine positing wherein the hole collar is detected and the insertion device is driven from the vicinity to the collar. In WO 2011/104441 a rock drilling rig comprises a drilling unit for drilling drill holes in a drill hole pattern. The location of the drilling unit is determined and a control unit is arranged to control (by means of a control member) on the basis of a given target position, actuators influencing the position of the drilling unit. The number, depth, diameter, start locations and directions of drill holes may be determined in a reinforcement pattern, which represents one form of drilling patterns. The reinforcement drill holes may be drilled in fan form, whereby there are drill holes on both walls and on the ceiling of the tunnel.

SUMMARY OF THE INVENTION

In view of the above, an objective of the invention is to solve or at least reduce one or several of the drawbacks discussed above. Generally, the above objective is achieved by the attached independent patent claims.

According to a first aspect, the present invention is realized by a method for mounting bolts in a tunnel wall. The method comprises: storing actual data representing the actual positions of bore holes having been bored in the tunnel wall by a drill rig, and a control unit instructing a bolting device to mount bolts in the bore holes based on the stored actual data.

This is advantageous in that the mounting of bolts can be performed quickly and correctly. Moreover, the bolts need not be mounted manually. Instead, the process can be automated. Additionally, the working environment for the construction workers is improved massively. The position of standing and performing movements above the shoulders is extremely tiring.

The control unit may be arranged to store configurations of the drill rig when the drill rig is boring the bore holes in the tunnel wall, and the control unit may be arranged to transform the configurations of the drill rig into configurations for the bolting device. This is advantageous in that it simplifies the mounting of the bolts.

The configurations of the drill rig and the bolting device may comprise configurations of actuators arranged to actuate parts of the drill rig and the bolting device. This is advantageous in that it simplifies the mounting of the bolts.

The step of instructing may comprise the control unit instructing the bolting device to configure its actuators in accordance with the configurations of the bolting device. This is advantageous in that it simplifies the mounting of the bolts.

The control unit may provide bolt mounting reference data comprising at least one of dimension information, angle information, position information, depth information, grout amount information, and grout injection depth information. This is advantageous in that information useful when mounting bolts is provided. As an example, lengths of the bolts protruding from the bore holes can be specified in the bolt mounting reference data such that the space formed by the bolts is shaped in a desirable way. This is advantageous in that the mounting of the bolts, such as, e.g., the size and position of the bore holes, can be adapted to conditions in the tunnel. Positions that are often under large stress, e.g. due to collisions, can suitably bolted.

The bolting device may comprise a bolter comprising a bolt holder, an arm, and a bolt applicator. The bolt holder may comprise bolts of different dimensions. The control unit may instruct the bolter to influence the arm to pick bolts having dimensions in accordance with the dimension information from the bolt holder and to provide the bolts to the bolt applicator.

Having bolts of different dimensions is advantageous in that the mounting of bolts can be adapted to prevailing conditions.

The bolter may comprise a grout injector. The method may further comprise: the control unit instructing the grout injector to inject amounts of grout in the bore holes in accordance with the grout amount information. This is advantageous in that the amount of grout can be adapted to, e.g. bore hole depth and bolt dimension.

The control unit may instruct the drill rig to bore the bore holes based on at least one of the position information, the depth information, and the angle information. This is advantageous in that the bore holes can be bored such that the bore hole depths, angles and positions are adapted to a desired shape of the tunnel.

The control unit may instruct the bolting device to insert the grout injector to a depth in the bore holes not exceeding a depth specified by the grout injection depth information.

This is advantageous in that it is avoided that the grout injector crashes into a bottom of the bore hole risking damaging the grout injector.

According to a second aspect, the present invention is realized by a method for mounting bolts in a tunnel wall. The method comprises: generating bolt mounting reference data, and performing any one of steps of the first aspect. This is advantageous in that information useful when mounting bolts is provided.

The method may further comprise adapting the bolt mounting reference data with tunnel shape information.

This is advantageous in that information about the actual shape of the tunnel can be taken into account when generating the bolt mounting reference data.

According to a third aspect, the present invention is realized by a computer program product comprising a computer-readable medium with instructions for performing the method of the first and/or the second aspect.

According to a fourth aspect, the present invention is realized by an arrangement for mounting bolts in a tunnel wall. The arrangement comprises: a bolting device and a control unit, the control unit being arranged to store actual data representing the actual positions of bore holes having been bored in the tunnel wall by a drill rig, and the control unit being arranged to instruct the bolting device to mount bolts in the bore holes based on the stored actual data.

The control unit being may be arranged to store configurations of the drill rig when the drill rig is boring the bore holes in the tunnel wall, and the control unit being may be arranged to transform the configurations of the drill rig into configurations for the bolting device.

The configurations of the drill rig and for the bolting device may comprise configurations of actuators arranged to actuate parts of the drill rig and the bolting device.

The control unit may be may be arranged to instruct the bolting device to configure its actuators in accordance with the configurations of the bolting device.

The control unit may be arranged to provide bolt mounting reference data comprising at least one of dimension information, angle information, position information, depth information, grout amount information, and grout injection depth information.

The arrangement may further comprise a bolter. The bolter may comprise a bolt holder comprising bolts of different dimension, an arm, and a bolt applicator, and the control unit may be arranged to instruct the bolt applicator to pick bolts from the bolt holder having dimensions in accordance with the dimension information.

The bolter may comprise a grout injector, and the control unit may be arranged to instruct the grout injector to inject amounts of grout in the bore holes in accordance with the grout amount information.

The control unit may be arranged to instruct the bolting device to insert the grout injector to a depth in the bore holes not exceeding a depth specified by the depth information.

The control unit may be arranged to instruct the drill rig to bore the bore holes based on the position information.

The arrangement may further comprise a bolt supply. The bolt supply may be a plurality of boxes, each box comprising bolts of one size. This is advantageous in that it increases the chance of the right bolts being on the right position and thus can the risk of errors be minimized. The bolt supply may be a revolver comprising bolts of different size. The plurality of boxes are easy to load and easy to exchange. The boxes can be arranged to be retractable. Then, during loading of the boxes, the boxes can be retracted to a loading position. The loading position can be safe for the persons loading the boxes so that they are not hit by, e.g., the bolter.

The bolt holder may be arranged to retrieve bolts from the bolt supply. The control unit may be arranged to instruct the bolt holder to retrieve bolts from the bolt supply. The bolt holder may be arranged to retrieve bolts from the bolt supply in an order specified by the control unit. The bolt holder may be arranged to retrieve bolts from the bolt supply at a point in time specified by the control unit. The bolt holder may be arranged to retrieve bolts of a certain dimension from the bolt supply, as specified by the control unit.

The arrangement may further comprise the drill rig.

The bolting device may further comprise a first jib and the drill rig may further comprise a second jib.

The first jib may be arranged on a first turntable and the second jib may be arranged on a second turntable.

The arrangement may further comprise a frame, the first and second jib being may be arranged on the frame and may be arranged to move along the frame. The first and second turntable may be arranged on the frame and may be arranged to move along the frame. The frame may be arranged on a vehicle or a trailer.

The advantages of the first aspect are equally applicable to the second, third, and the fourth aspect. Furthermore, it is to be noted that the aspects can be embodied in accordance with each other.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Other features and advantages of the present invention will become apparent from the following detailed description of a presently preferred embodiment, with reference to the accompanying drawings, in which

FIG. 4 is perspective view of the inventive arrangement of FIG. 1 from another direction.

FIG. 5 is a front view of a part of the inventive bolting device of FIGS. 1-2, and 3.

DETAILED DESCRIPTION OF PREFERRED EMBODIMENTS OF THE INVENTION

Figure 1:
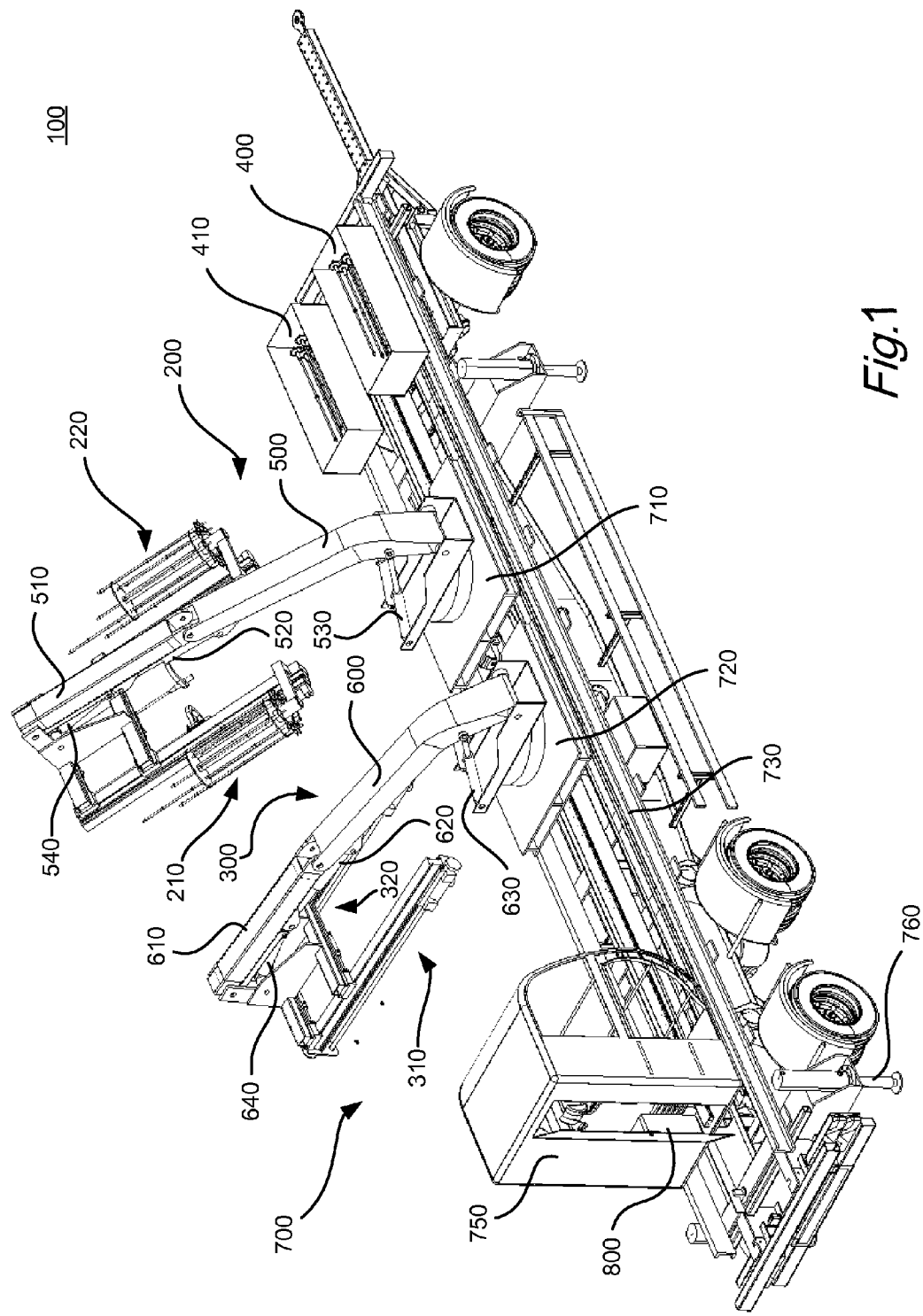
FIG. 1 is a perspective view of an embodiment of the inventive arrangement.

The present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

When building a tunnel through a rock, a cavity is formed in the mountain usually by means of blasting. Bolts are mounted in the walls of the tunnel, e.g. in order to provide reinforcement. The bolts can be used as crash protection or as protection against landslide. In one embodiment, the bolts each have an inside washer for holding a water tight membrane. Strips of a water tight membrane can be attached to the inside washers and secured in place by outside washers. The water tight membrane protects the inside of the tunnel from, e.g., water and ice.

During planning of the shape of the tunnel, a three-dimensional (3D) model of the tunnel is created. The 3D model can, e.g., be generated using computer-aided design (CAD). Bolt mounting reference data can be included in the 3D model. Alternatively, bolt mounting reference data can be a separate computer file. The bolt mounting reference data can be generated from the 3D model.

A couple of examples on what types of information can be included in the bolt mounting reference data follow. Bolt mount reference data can, e.g., comprise at least one of dimension information, angle information, position information, depth information, grout amount information, and grout injection depth information. When creating the 3D model, it is, e.g., computed what dimension which bolt is to have. Dimension information can, e.g., include at least one of thickness and length of bolts. Angle information can include at what angle the bolt is to be set and/or the bore hole is to be bored. The angles can be defined in relation to a center of the tunnel. Depth information can comprise how deep bore holes have to be bored. Grout amount information can specify how much grout is to be injected in each bore hole. Grout injection depth information can comprise information about what depth that is not to be exceeded when inserting the grout injectors into the bore holes. Position information can comprise information about in what positions the bore hole is to be bored. The position information can include coordinates of positions of bore holes to be bored and/or configurations of the drill rig. Bolt mounting reference data can also be referred to as tunnel design information.

Positions of some bolts, e.g. positions of the bolts for holding the water tight membrane, may have to be adjusted in order to make room for reinforcement bolts. Parts of the tunnel wall that are exposed to a lot of strain, such as, e.g., the lower parts that might more frequently be run into by vehicles, may advantageously have more reinforcement bolts than other parts of the tunnel wall.

In one embodiment of the invention, after having blasted the tunnel, the tunnel is scanned using, e.g., laser in order to obtain the actual shape of the tunnel. The actual shape of the tunnel can then be compared with the planned/theoretical shape. The bolt mounting reference data is updated based on a result of the scan of the tunnel. If, e.g., a part of the tunnel has been blasted deeper into the rock than planned, the bolts to be mounted in that part can be mounted such that the part of the bolt protruding from the tunnel wall is longer than first planned. The bolt mounting reference data is therefore updated accordingly. As an example, it is specified in the bolt mounting reference data that longer bolts are to be used in this part or that the bore holes are to be made shallower.

Instead if, e.g., a part of the tunnel has been blasted not so deep as planned, the bolt mounting reference data may be updated to include shorter bolts in this part or the bore holes might be drilled deeper into the tunnel wall.

The bolts are usually mounted with a centre distance of about 1.2 m. Typically, bolts have diameters of 16 mm. It is however to be noted that this is only mentioned by way of example, other center distances and diameters are also possible.

The bolts can, e.g., be mounted beginning at a part of the tunnel wall that is close to the ground of the tunnel and further extending along the inner roof of the tunnel to the other side of the tunnel being close to the ground of the tunnel. In one embodiment, the bolts are set in semicircles extending over the inner roof of the tunnel. Each semicircle can be referred to as a section. One section can, e.g., comprise 23 bolts. In one example, the bolts are set in pairs which implies that one section can comprise 46 bolts. It is to be noted that any order of setting the bolts is possible.

When boring the bore holes, even if the drill rig boring the bore holes attempts to bore in accordance with the bolt mounting reference data, the bore holes might not end up exactly as planned. The actual positions of the bore holes might not be equal to the positions specified in the bolt mounting reference data. In that case, even if the bolting device which is to mount the bolts in the bore holes has information about the planned bore hole positions, it is difficult for the bolting device to correctly locate the bore holes since the actual positions of the bore holes are not the same as the planned bore hole positions. The present invention attempts to mitigate these difficulties.

A description of an embodiment of the inventive method is hereby presented.

The bolt mounting reference data is generated. The bolt mounting reference data may, e.g., be comprised in a computer file. The bolt mounting reference data can, e.g., be generated using CAD (computer aided design). The bolt mounting reference data generated using CAD can, e.g., be three dimensional. The blasted tunnel is scanned to obtain an actual shape of the tunnel. The bolt mounting reference data is adapted to the tunnel shape information. The bolt mounting reference data might, e.g., be adapted in that positions of a plurality of bolts or in that bore hole depths are amended.

The control unit is provided with the bolt mounting reference data. The control unit then instructs a drill rig to bore the bore holes in accordance with the bolt mounting reference data. The control unit also instructs a bolting device to mount bolts in the bore holes in accordance with the bolt mounting reference data.

The trailer on which the drill rig and the bolting device are arranged is transported to a first predetermined location. Information about this location may also be included in the bolt mounting reference data. The position of the trailer is calibrated using a plurality of prisms and if necessary, the position of the trailer is adjusted. The supports of the trailer are lowered resulting in the trailer not being able to move.

The drill rig bores pairs of holes in the rock in a semicircle covering at least the walls and inner roof of the tunnel. The inner roof may also be referred to as the tunnel wall. The drill rig is associated with a second jib and the second jib is arranged on a frame. The position of the second jib on the frame, during boring of these pairs of holes is here denoted with current position. The drill rig bores the holes in accordance with the position information. Actual data representing the actual positions of bore holes having been bored in the tunnel wall by the drill rig is stored. This actual data can, e.g., be configurations such as lengths of cylinders arranged to actuate parts of the drill rig, or angles between parts of the drill rig. The actual data can be stored on some sort of storage device known to the skilled person. The drill rig and its jib are then moved along the frame from the current position to a next position. Information about the positions of the jib on the frame may be included in the bolt mounting reference data and may also be stored as actual data representing the actual positions of the bore holes. After that, the drill rig bores a new semicircle of pairs of bore holes.

The control unit instructs the bolting device such that the jib associated with the bolting device, a first jib, is moved along the frame to what was the current position of the second jib, in accordance with the stored actual data. The first jib and its cylinders are configured in accordance with the stored actual data representing the actual positions of the bore holes resulting in that the bolting device is able to locate the bore holes having been bored by drilling steels of the drill rig. Grout injectors of the bolting device inject grout in the bore holes. The amount of grout injected in the bore holes is in accordance with the grout amount information. The grout injectors are inserted in the bore holes and start injecting grout in the bottom of the bore holes. During injection of grout, the grout injectors are retracted from the bore holes. This is advantageous in that the amount of air between the bottom of the bore hole and the injected grout is minimized. The grout injectors are not inserted to a depth deeper in the bore holes than the depths specified by the grout injection depth information. Thus, the risk of damaging the grout injectors by crashing them into the bottom of the bore holes is reduced.

The bolting device can comprise bolt applicators which pick bolts from bolt holders. Which bolts are picked is decided by the dimension information. If there is no bolt in the bolt holder of the dimension that is desired, the bolt holder retrieves at least one bolt from a bolt supply. The control unit and/or the bolting device store information about the position that the bolting device was in before retrieving the at least one bolt. Thereby, the bolting device can continue mounting bolts without missing any bore holes. When retrieving new bolts from the bolt supply the first jib is rotated and bent such that the bolt holder can be pressed towards the bolts in boxes of the bolt supply such that new bolts are pressed into the bolt holder. In one embodiment, the control unit provides information about when the bolt holders need to retrieve new bolts from the bolt supply. The control unit also provides, in one embodiment, information about what dimension the bolts in the boxes of the bolt supply have.

The boring of bore holes and mounting of bolts continues until the jibs have been moved to the end of the frame. In one embodiment, this implies that the drill rig has bored three pairs of semicircles with bore holes and the bolting device has mounted three pairs of semicircles of bolts. After that the vehicle is moved a distance and the new pairs of semicircles of bore holes are bored and bolts are mounted in the bore holes.

The boring of the bore holes and the setting of bolts in the bore holes can be performed simultaneously. In one embodiment, the bolting device mounts bolts in a first section of bore holes at the same time as the drill rig bores bore holes of a second section. The second section being arranged next to the first section. The first section comprising bore holes having been bored by the drill rig.

FIG. 1 is a perspective view of an embodiment of the inventive arrangement. The arrangement 100 comprises a bolting device 200 and a drill rig 300. The bolting device 200 comprises a first jib 500 and the drill rig 300 comprises a second jib 600. In one embodiment, the bolting device is arranged on the first jib 500 and the drill rig is arranged on the second jib 600. It is also possible to arrange the bolting device 200 and the drill rig 300 on one jib.

The first and second jibs 500, 600 are arranged on a first and second turntable 710 720, respectively. The first and second turntable 710 and 720 are arranged to rotate. In one embodiment, the first and second turntable 710 and 720 are arranged to rotate 360°. A motor (not shown) is arranged to actuate the rotation of the first and second turntable 710 and 720.

The first and second turntable 710 and 720 are arranged on a frame 730. The frame 730 is arranged on a trailer 700. The first and second turntable 710, 720 are arranged to move along the frame 730 in a direction along a movement direction of the trailer 700. A motor (not shown) is arranged to actuate the movement of the first and second turntable 710, 720 along the frame 730. In one embodiment, the jibs 500, 600 are arranged on separate trailers.

The jibs 500, 600 each have a top part, 510, 610. The top parts 510, 610 are arranged to be lowered and raised. Cylinders are arranged to actuate the movement of the top parts 510, 610. The cylinder controlling the movement of the top part 510 is denoted with 520 and the cylinder controlling the movement of the top part 610 is denoted with 620. Cylinder 530 is arranged to actuate jib 500 such that the jib 500 is raised and/or lowered. Cylinder 630 is arranged to actuate jib 600 such that the jib 600 is raised and/or lowered.

The bolting device comprises at least one bolter. In the embodiment in FIG. 1, the bolting device 200 comprises two bolters 210, 220.

A cylinder 540 is arranged to actuate a lowering and/or raising motion of the bolters 210 and 220. A cylinder 640 is arranged to actuate a lowering and/or raising motion of the drill 310. At least one motor (not shown) can be arranged to control the cylinders mentioned herein.

The top part 510 can comprise a cylinder (not shown) which is arranged to cause a motion in a direction of the top part 510 thereby moving the bolters 210 and 220 in the direction of the top part 510.

The drill rig 300 has in this embodiment two drilling steels 310, 320. Having two drilling steels has the advantage that two holes can be bored simultaneously. It is to be noted that any number of drilling steels is comprised in the embodiments of the inventive arrangement.

In one embodiment, the drilling steels 310 and 320 have the same dimension. In one embodiment, drill rig 300 is configured such that the drilling steels 310 and 320 bore holes of equivalent depths.

The top part 610 can comprise a cylinder (not shown) which is arranged to cause a motion in a direction of the top part 610 thereby moving the drilling steels 310 and 320 in the direction of the top part 610.

The arrangement comprises a control unit. As an alternative, the control unit can be a part of the drill rig. The control unit can be arranged in an operator's cabin of a vehicle or trailer. In FIG. 1, the control unit 800 is arranged in the operator's cabin 750 of the trailer 700.

The control unit 800 is arranged to store actual data representing the actual positions of bore holes having been bored in the tunnel wall by the drill rig 300. The cylinders can have linear gauges (not shown). The linear gauges can be arranged to acquire information about the positions of the cylinders. In one embodiment, the linear gauges are arranged to acquire information about lengths of the cylinders during boring of the bore holes. In another embodiment, the linear gauges are arranged in joints and measure angles of the joints. The joints can, e.g., be joints between top part and jib, jib and turntable, and top part and bolter/drilling steels.

The stored actual data can comprise configurations of actuators arranged to actuate parts of the drill rig. The actuators can, e.g., be the cylinders. The actuators can, e.g., also be the motor arranged to actuate the movement of the first and second turntable 710, 720 along the frame 730 or any other motor described herein. The configurations can comprise the positions of the first and second turntable 710, 720 on the frame 730.

In one embodiment, the stored actual data can comprise angles of joints connecting parts of the drill rig.

Configurations of the joints and cylinders of the drill rig 300 can be stored by the control unit 800. In one embodiment, positions of the cylinders are stored by the control unit during boring of the bore holes. In one embodiment, lengths of the cylinders are stored by the control unit during boring of the bore holes. The control unit 800 can be arranged to transform the configurations of the cylinders of the drill rig 300 into configurations of the cylinders of the bolting device 200. The configurations of the cylinders of the bolting device can, e.g., comprise information about specific settings of some or all of the cylinders. The control unit 800 can be also arranged to transform the configurations of the joints of the drill rig 300 into configurations of the joints of the bolting device 200. The configurations of the joints of the bolting device can, e.g., comprise information about specific settings of some or all of the joints.

The control unit can also be arranged to store the positions of the first and second turntable 710, 720 on the frame 730.

In one embodiment, after the drill rig 300 has bored holes in a section, the drill rig 300 is moved along the frame 730 in order reach a next position. In the next position, the drill rig 300 bores the next section of holes.

In one embodiment, after the bolting device 200 has mounted bolts in a section, the bolting device 200 is moved along the frame 730 in order reach a next position. In the next position, the bolting device 200 mounts bolts in the next section of holes.

The control unit can instruct the drill rig where to bore the bore holes. This is specified in the position information. In one embodiment, the control unit provides the drill rig with coordinates of positions of bore holes to be bored. In another embodiment, the control unit provides the drill rig with configurations of the cylinders or configurations of the joints.

The control unit can provide bolt mounting reference data. The bolt mounting reference data can be sent to the control unit through wire or wireless communication or by any other means known to the skilled person.

Figure 2:
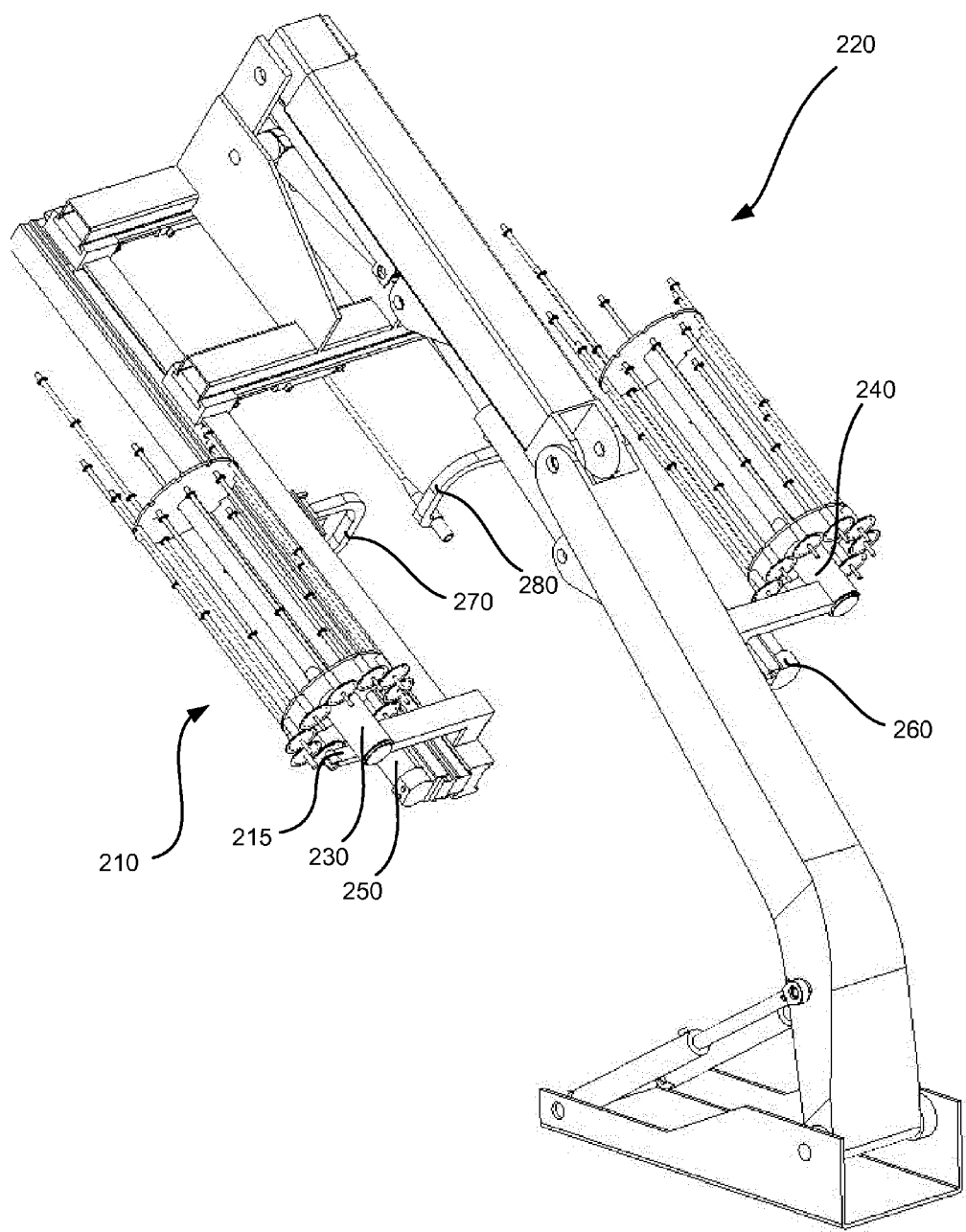
FIG. 2 is a perspective view of the inventive bolting device of FIG. 1.

FIG. 2 is a perspective view of the bolting device of FIG. 1. The bolters 210, 220 each comprise a bolt holder 230 and 240 and a bolt applicator 250, 260.

The bolter 210 comprises an arm 215. The arm 215 can be arranged to pick bolts from the bolt holder 230 and to provide picked bolts to bolt applicator 250. Another arm (not shown) can be arranged to pick bolts from the bolt holder 240 and to provide picked bolts to bolt applicator 260. The bolt applicators 250, 260 insert the bolts in bore holes having been bored by the drill rig 300. As can be seen from, e.g., FIG. 2, the bolt holders 230, 240 are embodied as revolvers and comprise bolts of different dimension. The bolts can, e.g., have different length and/or thickness. The revolvers of the bolt holders 230, 240 can rotate such that suitable bolts are available for the bolt applicators 250, 260.

In one embodiment, the bolt holders can each have a plurality of revolvers, each revolver comprising bolts of one size.

The bolting device or the arrangement can further comprise a bolt supply. In this embodiment, illustrated in FIG. 1, the bolt supply is two boxes 400 and 410. Each box comprises bolts of one size. The bolting device 200 can retrieve bolts from the boxes 400, 410. In one embodiment, the bolting device retrieves bolts from the bolt supply when there are no bolts in the bolt holders. In another embodiment, the bolting device retrieves bolts from the bolt supply when there are no bolts of a certain dimension in the bolt holders. The jib 500 is rotated by rotating the turntable 710. At least one of the cylinders 510, 520, and 540 are actuated such that the jib is positioned so that at least one of the bolt holders 230 and 240 can be moved towards at least one of the boxes 400, 410. The bolt holder to be refilled with bolts is pressed onto the bolts in one of the boxes 400, 410 such that bolts are attached to the bolt holder, in this case a revolver. The boxes 400, 410 can be loaded with bolts by a machine or a person. During loading of the boxes 400, 410, the boxes can be retracted to a safe position so that the person and/or machine loading the boxes does not run a risk of being hit by the bolting device 200. The bolt holders 230 and 240 may hold bolts of a certain dimension at a certain position. The control unit provides information about what dimension a certain bolt in at certain position in bolt holders 230 and 240 is to have. During refilling of the bolt holders 230 and 240, the position dimension information provided by the control unit is used for knowing which bolt is to be arranged where.

In another embodiment, the bolt supply may be at least one revolver comprising bolts of different size or comprising bolts of one size. The entire revolver of the bolt holder is then exchanged with a new revolver from the bolt supply.

Figure 3:
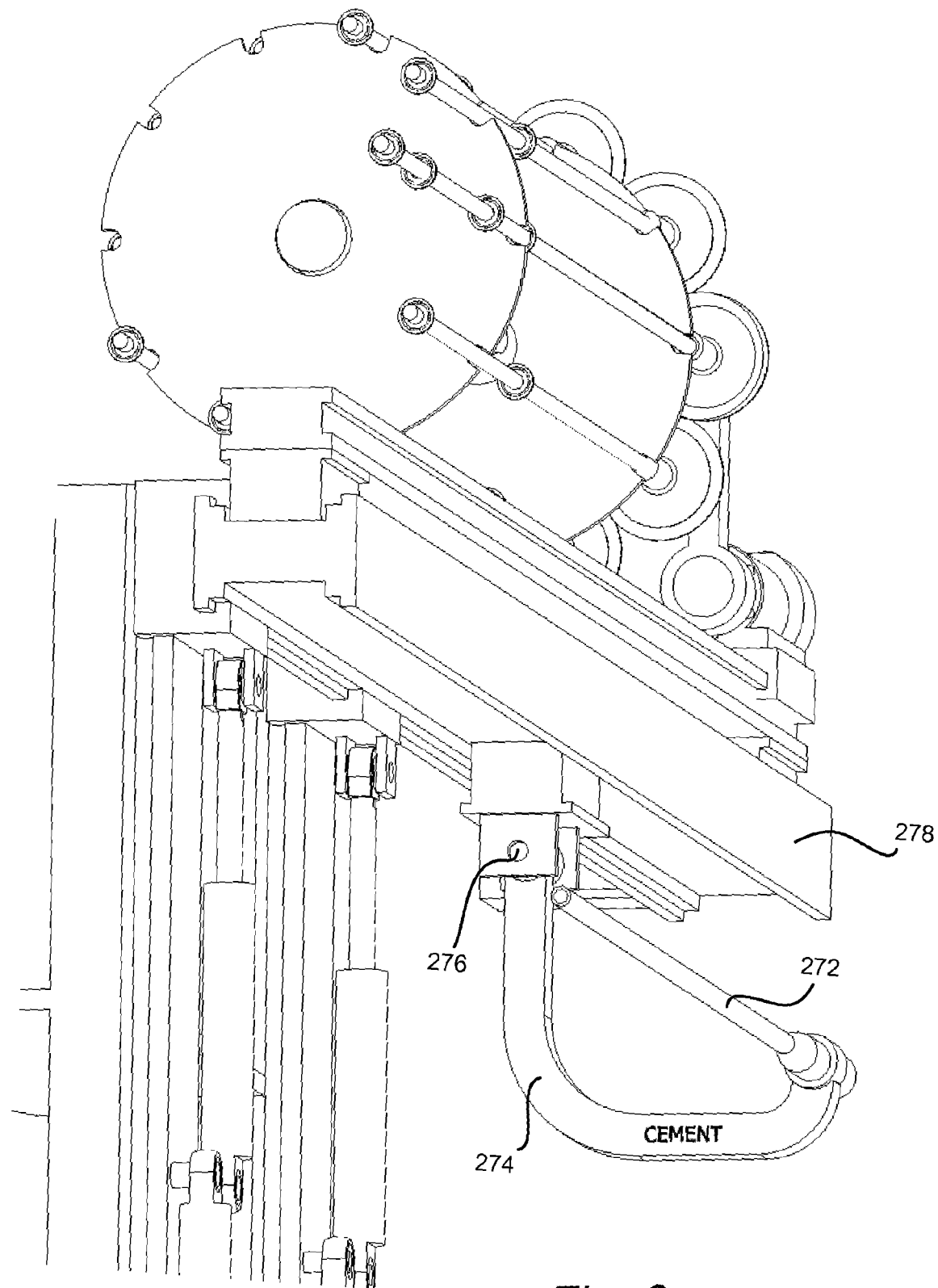
FIG. 3 is a perspective view of the inventive grout injector and inventive the bolt holder of FIGS. 1 and 2.

The bolter can further comprise at least one grout injector. The bolters 210, 220 comprise grout injectors 270, 280 (see FIG. 2). The grout injectors 270, 280 are arranged to inject grout in the bore holes. The amount of grout to be injected in which bore hole can be specified in the grout amount information. The grout injectors can comprise a nozzle and a lever. FIG. 3 is a perspective view of the grout injector 270 and the bolt holder 230. The grout injector comprises a nozzle 272 and a lever 274. The lever 274 can be arranged to rotate around a rotating joint 276. The lever 274 can be arranged to on a rail 278 and can be arranged to move on the rail 278 in a direction of the nozzle 272.

FIG. 4 is perspective view of the inventive arrangement from another direction. Cylinders 279 and 289 are arranged to move the bolter 210 in a horizontal direction. Cylinders 259 and 269 are arranged to move the bolter 220 in a horizontal direction. This is advantageous in that the bolter 200 can adapt distances between the bolters. The distances can, e.g., be adapted in relation to distances between bore holes having been bored the drill rig.

The bolt applicators are arranged to move along rails such the bolts can be inserted in bore holes.

When the trailer 700 is to be moved to a next position, the supports 760 are lifted and the trailer 700 is moved, e.g. by another vehicle pulling the trailer 700. When the next position is reached, the position of the trailer 700 is calibrated using a plurality of prisms. If necessary, the position of the trailer 700 is adjusted. The trailer is, e.g., moved to a next position when the drill rig 300 cannot be moved any further along the rail due 730 to an obstacle. The obstacle can, e.g., be the operator's cabin 750.

FIG. 5 is a front view of a part of the inventive bolting device of FIGS. 1-2, and 3.

The present invention is based on a desire to automate the process of mounting bolts. Humans are not necessary, neither for boring the holes, nor for mounting the bolts. Even the movement of the trailer can be automated. Furthermore, bolts of different dimensions can be used. The mounting of the bolts can be made in a very clever fashion in that the mounting of the bolts can be adapted to the result of the blasting of the tunnel. The present invention provides for the entire process, from generation of the bolt mounting reference data to the result of a bolted tunnel.

The cylinders and motors described herein can, e.g., be electric, pneumatic, and/or hydraulic.

It is to be noted that all embodiments and features described in this application are applicable on all aspects of the invention.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method for mounting bolts in a tunnel wall, comprising:
    a control unit receiving bolt mounting reference data,
    the control unit instructing a drill rig to bore bore holes in accordance with said bolt mounting reference data,
    the control unit storing actual data representing the actual positions of bore holes having been bored in the tunnel wall by the drill rig, and
    the control unit instructing a bolting device to mount bolts in the bore holes based on the stored actual data and the bolt mounting reference data, the step of storing actual data further comprising:
    the control unit storing configurations of the drill rig when the drill rig is boring the bore holes in the tunnel wall, and
    the control unit transforming the configurations of the drill rig into configurations for the bolting device, the configurations of the drill rig and the bolting device comprising configurations of actuators arranged to actuate parts of the drill rig and the bolting device,
    wherein said configurations comprise positions of a first and a second turntable on a frame,
    wherein said bolting device is arranged on said first turntable and said drill rig is arranged on said second turntable, and said first and second turntable are arranged to move along said frame.

2. The method according to claim 1, the step of instructing comprising the control unit instructing the bolting device to configure its actuators in accordance with the configurations of the drill rig.

3. The method according to claim 1, further comprising:
    the bolt mounting reference data comprising at least one of dimension information, angle information, position information, depth information, grout amount information, and grout injection depth information.

4. The method according to claim 3, the bolting device comprising a bolter, the bolter comprising a bolt holder comprising bolts of different dimensions, an arm, and a bolt applicator, the method further comprising:
    the control unit instructing the bolter to influence the arm to pick bolts having dimensions in accordance with the dimension information from the bolt holder and to provide the bolts to the bolt applicator.

5. The method according to claim 3, the bolter comprising a grout injector, the method further comprising:
    the control unit instructing the grout injector to inject amounts of grout in the bore holes in accordance with the grout amount information.

6. The method according to claim 3, further comprising:
    the control unit instructing the drill rig to bore the bore holes based on at least one of the position information, the depth information, and the angle information.

7. The method according to claim 5, further comprising:
    the control unit instructing the bolting device to insert the grout injector to a depth in the bore holes not exceeding a depth specified by the grout injection depth information.

8. A method for mounting bolts in a material, comprising:
    generating bolt mounting reference data, and
    performing the steps of claim 1.

9. The method according to claim 8, further comprising adapting the bolt mounting reference data with tunnel shape information.

10. A computer program product comprising a non-transitory computer-readable medium with instructions for performing the method of claim 1.

11. An arrangement for mounting bolts in a tunnel wall comprising a frame, first and second turntables on the frame, a bolting device, and a control unit,
    the control unit being arranged to receive bolt mounting reference data, and being arranged to instruct a drill rig to bore bore holes in accordance with said bolt mounting reference data,
    the control unit being arranged to store actual data representing the actual positions of bore holes having been bored in the tunnel wall by the drill rig, and
    the control unit being arranged to instruct the bolting device to mount bolts in the bore holes based on the stored actual data and the bolt mounting reference data, further comprising,
    the control unit being arranged to store configurations of the drill rig when the drill rig is boring the bore holes in the tunnel wall, and
    the control unit being arranged to transform the configurations of the drill rig into configurations for the bolting device, the configurations of the drill rig and for the bolting device comprising configurations of actuators arranged to actuate parts of the drill rig and the bolting device,
    wherein said configurations comprise positions of the first and the second turntable on the frame, and
    wherein said bolting device is arranged on said first turntable and said drill rig is arranged on said second turntable, and said first and second turntable are arranged to move along said frame.

12. The arrangement according to claim 11, the control unit being arranged to instruct the bolting device to configure its actuators in accordance with the configurations of the drill rig.

13. The arrangement according to claim 11, further comprising:
   the control unit being arranged to provide bolt mounting reference data comprising at least one of dimension information, angle information, position information, depth information, grout amount information, and grout injection depth information.

14. The arrangement according to claim 13, further comprising:
   a bolter, the bolter comprising a bolt holder comprising bolts of different dimension, an arm and a bolt applicator, and
   the control unit being arranged to instruct the bolt applicator to pick bolts from the bolt holder having dimensions in accordance with the dimension information.

15. The arrangement according to claim 13, the bolter comprising a grout injector, and the control unit being arranged to instruct the grout injector to inject amounts of grout in the bore holes in accordance with the grout amount information.

16. The arrangement according to claim 15, further comprising:
   the control unit being arranged to instruct the bolting device to insert the grout injector to a depth in the bore holes not exceeding a depth specified by the depth information.

17. The arrangement according to claim 13, further comprising the control unit being arranged to instruct the drill rig to bore the bore holes based on at least one of the position information, the depth information, and the angle information.

18. The arrangement according to claim 11, further comprising a bolt supply,
   the bolt supply being a plurality of boxes, each box comprising bolts of one size, and/or
   the bolt supply being a revolver comprising bolts of different size.

19. The arrangement according to claim 18, the bolt holder being arranged to retrieve bolts from the bolt supply.

20. The arrangement according to claim 11, further comprising the drill rig.

21. The arrangement according to claim 20, further comprising a first jib and a second jib, wherein the bolting device is arranged on said first jib and the drill rig is arranged on said second jib.

22. The arrangement according to claim 21, wherein the first and second jib are arranged on the frame and are arranged to move along the frame.

23. An arrangement for mounting bolts in a tunnel wall comprising:
   a frame having an axis;
   first and second turntables arranged on the frame and movable along the frame in a direction along the axis;
   a bolting device arranged on the first turntable;
   a drill rig arranged on the second turntable; and
   a control unit arranged to receive bolt mounting reference data and being arranged to instruct the drill rig to bore bore holes in accordance with said bolt mounting reference data,
   wherein the control unit is arranged to store actual data representing the actual positions of bore holes having been bored in the tunnel wall by the drill rig,
   wherein the control unit is arranged to instruct the bolting device to mount bolts in the bore holes based on the stored actual data and the bolt mounting reference data,
   wherein the control unit is arranged to store configurations of the drill rig when the drill rig is boring the bore holes in the tunnel wall,
   wherein the control unit is arranged to transform the configurations of the drill rig into configurations for the bolting device, the configurations of the drill rig and for the bolting device comprising configurations of actuators arranged to actuate parts of the drill rig and the bolting device, and
   wherein said configurations comprise positions of the first and the second turntable on the frame.

* * * * *